United States Patent
Swetish et al.

(12)

(10) Patent No.: US 6,232,685 B1
(45) Date of Patent: May 15, 2001

(54) NUTATIONAL MOTOR

(75) Inventors: Thomas R. Swetish, Racine; Todd A. Rathe, Mequon, both of WI (US)

(73) Assignee: Johnson Outdoors Inc., Sturtevant, WI (US)

( * ) Notice: Subject to any disclaimer, the term of this patent is extended or adjusted under 35 U.S.C. 154(b) by 0 days.

(21) Appl. No.: 09/315,079

(22) Filed: May 19, 1999

(51) Int. Cl.[7] .............................. H02K 11/00; H02K 7/06
(52) U.S. Cl. ................................. 310/71; 310/81
(58) Field of Search ............................... 310/71, 40.5, 38, 310/172, 80, 81, 82, 76, 163, 68 R, 36, 166, 75 R (56) References Cited

U.S. PATENT DOCUMENTS

| | | | |
|---|---|---|---|
| 1,862,356 | * 6/1932 | Warren | 310/163 |
| 2,561,890 | 7/1951 | Stoddard | 417/353 |
| 2,969,472 | * 1/1961 | Faller | 310/82 |
| 3,294,994 | 12/1966 | Anderson | 310/82 |
| 3,334,253 | 8/1967 | Hill | 310/82 |
| 3,452,227 | 6/1969 | Welch | 310/82 |
| 3,558,944 | 1/1971 | Verge et al. | 310/82 |
| 3,577,049 | 5/1971 | Madurski | 318/138 |

(List continued on next page.)

FOREIGN PATENT DOCUMENTS

| | | |
|---|---|---|
| 10132 229 | 6/1982 | (DE) . |
| 31 30 792 | 3/1983 | (DE) . |
| 2 596 217 | 9/1983 | (FR) . |

OTHER PUBLICATIONS

Schü, Brinkmann: "Dauermagnete, Werkstoffe und Anwendungen"1970, Springer Verlag, Germany XP002147721 p. 490–pp.491; figure 55.39.

*Primary Examiner*—Nestor Ramirez
*Assistant Examiner*—Guillermo Perez
(74) *Attorney, Agent, or Firm*—Foley & Lardner (57) ABSTRACT

A motor for use with an alternating current electrical outlet includes a retaining member, a rotor and a nutational actuator for nutating the rotor. The retaining member has at least one circumferential surface extending about an axis. The rotor is located adjacent to the retaining member and includes a magnet. The rotary actuator includes at least one magnetic member proximate the rotor, an electrically conductive coil about the at least one magnetic member and a plug having first and second prongs electrically connected to first and second ends of the coil. When the prongs are inserted into the electrical outlet, the alternating current flowing through the coil causes the rotor to nutate about the axis defined by the retaining member. In one exemplary embodiment, the rotor has a center of mass such that the rotor gyrates about the center of mass in response to alternating electrical currents flowing through the coil. In one exemplary embodiment, the retaining member is formed from a non-magnetic material and is integrally formed as part of a single unitary structure with a body supporting the magnetic member. According to one method, the motor is formed by providing a magnetic member having an axial end; wrapping an electrically conductive coil about the magnetic member, wherein the magnetic member has first and second opposite ends adapted for being connected to a source of an alternating electrical current; molding a mass of non-magnetic material about the magnetic member and the electrically conductive coil to form a body; forming a retaining member having an axis within the body proximate the axial end of the magnetic member; and positioning a rotor along the axis of the retaining member.

53 Claims, 2 Drawing Sheets

U.S. PATENT DOCUMENTS

| | | | |
|---|---|---|---|
| 3,792,295 | 2/1974 | Garbi | 310/46 |
| 3,824,418 * | 7/1974 | Balchunas | 310/71 |
| 3,872,280 | 3/1975 | Van Dalen | 392/390 |
| 3,990,848 | 11/1976 | Corris | 422/49 |
| 4,002,378 | 1/1977 | Meinke | 384/200 |
| 4,035,451 | 7/1977 | Tringali | 261/101 |
| 4,037,352 | 7/1977 | Hennart et al. | 43/129 |
| 4,059,422 | 11/1977 | Steiner | 96/147 |
| 4,094,298 | 6/1978 | Kober | 126/263.1 |
| 4,111,655 | 9/1978 | Quincey | 422/124 |
| 4,197,271 | 4/1980 | Fenstermaker et al. | 422/123 |
| 4,214,146 | 7/1980 | Schimanski | 392/390 |
| 4,220,281 | 9/1980 | Martens et al. | 239/57 |
| 4,251,714 | 2/1981 | Zobele | 392/392 |
| 4,294,493 | 10/1981 | Sindlinger et al. | 310/90.5 |
| 4,301,095 | 11/1981 | Mettler et al. | 261/30 |
| 4,353,602 | 10/1982 | Habermann | 310/90.5 |
| 4,367,424 | 1/1983 | Presley | 310/82 |
| 4,391,781 | 7/1983 | van Lit | 422/125 |
| 4,396,557 | 8/1983 | DeLuca | 261/30 |
| 4,467,177 | 8/1984 | Zobele | 392/392 |
| 4,482,828 | 11/1984 | Vergues et al. | 310/83 |
| 4,614,299 | 9/1986 | Loveren et al. | 239/6 |
| 4,627,963 | 12/1986 | Olson | 422/125 |
| 4,632,310 | 12/1986 | Konicek | 239/43 |
| 4,725,712 | 2/1988 | Schroeder | 392/392 |
| 4,728,837 | 3/1988 | Bhadra | 310/80 |
| 4,734,560 | 3/1988 | Bowen | 392/390 |
| 4,734,606 | 3/1988 | Hajec | 310/90.5 |
| 4,743,406 | 5/1988 | Steiner et al. | 261/30 |
| 4,749,898 | 6/1988 | Suzuke et al. | 310/114 |
| 4,755,709 | 7/1988 | De Jager | 310/90.5 |
| 4,808,347 | 2/1989 | Dawn | 261/30 |
| 4,837,421 | 6/1989 | Luthy | 392/390 |
| 4,837,470 | 6/1989 | Tamura | 310/82 |
| 4,840,770 | 6/1989 | Walz et al. | 422/49 |
| 4,849,181 | 7/1989 | Kelley et al. | 422/109 |
| 4,889,284 | 12/1989 | Spector | 239/34 |
| 4,906,881 | 3/1990 | Knight | 310/82 |
| 4,914,330 * | 4/1990 | Pierrat | 310/82 |
| 4,931,224 | 6/1990 | Holzner, Sr. | 261/30 |
| 5,000,383 | 3/1991 | van der Heijden | 239/47 |
| 5,050,798 | 9/1991 | Sullivan | 239/58 |
| 5,136,684 | 8/1992 | Lonker et al. | 392/392 |
| 5,142,932 | 9/1992 | Moya et al. | 74/490.05 |
| 5,147,582 | 9/1992 | Holzner, Sr. et al. | 261/30 |
| 5,155,402 | 10/1992 | Bichler | 310/90.5 |
| 5,211,316 | 5/1993 | Adalberto et al. | 222/386.5 |
| 5,237,234 | 8/1993 | Jebens et al. | 310/309 |
| 5,311,091 | 5/1994 | Maudal | 310/90 |
| 5,373,581 | 12/1994 | Smith | 392/390 |
| 5,402,517 | 3/1995 | Gellett et al. | 392/386 |
| 5,522,008 | 5/1996 | Bernard | 392/392 |
| 5,547,616 | 8/1996 | Dancs et al. | 261/26 |
| 5,574,821 | 11/1996 | Babasade | 392/392 |
| 5,579,290 * | 11/1996 | Zafferri et al. | 368/76 |
| 5,647,052 | 7/1997 | Patel et al. | 392/310 |
| 5,672,923 | 9/1997 | Jacobsen et al. | 310/82 |
| 5,700,991 | 12/1997 | Osbern | 219/430 |
| 5,788,155 | 8/1998 | Martin et al. | 239/34 |
| 5,796,914 | 8/1998 | Gatzemeyer et al. | 392/390 |

* cited by examiner

NUTATIONAL MOTOR

FIELD OF THE INVENTION

The present invention relates to electrically driven motors. In particular, the present invention relates to a nutational motor which has few parts and which is compact, easy to manufacture and inexpensive.

BACKGROUND OF THE INVENTION

Nutational motors are commonly used in applications, such as the operation of large fluid control valves, where the motors must provide high torque at low operating speeds. Nutational motors, such as those set forth in U.S. Pat. Nos. 5,237,234 and 5,672,923, typically include a rotor, a stator having a multiple magnetic lands encircling the rotor, a position sensor sensing the location of the rotor and an electrical sequencer for sequentially producing electromagnetic forces in the lands of the stator to sequentially attract and repel the rotor such that the rotor rotates against the magnetic lands about an axis.

Despite their electrical efficiency, such conventional nutational or electrostatic motors have been used in only a limited number of applications. This is largely due to the fact that the position sensor and the electrical sequencer are both relatively expensive electrical components which occupy space and which add cost to the manufactured motor. The multiple magnetic lands also increase the cost of such motors. As a result, the application of such electrostatic or nutational motors to small consumer products and one-time use products has been impractical.

Thus, there is a continuing need for a nutational or electrostatic motor which has fewer parts, which is compact and which can be easily manufactured at a lower cost.

SUMMARY OF THE INVENTION

The present invention provides a motor for use with an alternating current electrical outlet. The motor includes a retaining member, a rotor and a nutational actuator for nutating the rotor. The retaining member has a circumferential surface extending about an axis. The rotor is located adjacent to the retaining member stator and includes a magnet. The nutational actuator includes at least one ferromagnetic member proximate the rotor, an electrically conductive coil about the at least one ferromagnetic member and a plug having first and second prongs electrically connected to first and second ends of the coil. When the prongs are inserted into the electrical outlet, the alternating current flowing through the coil causes the rotor to nutate about the axis defined by the retaining member.

The present invention provides a motor for use with a source of an alternating electrical current. The motor includes a retaining member, a rotor, a magnetic member and an electrically conductive coil about the magnetic member. The retaining member has at least one circumferential surface extending about an axis. The rotor extends adjacent to the retaining member and has a center of mass and a magnet. The coil has first and second opposite ends adapted to be electrically connected to the source of alternating electrical current. The rotor gyrates about the center of mass in response to alternating electrical current flowing through the coil.

The present invention provides a motor for use with a source of alternating electrical current. The motor includes a retaining member, a rotor, a magnetic member proximate the rotor and an electrically conductive coil about the magnetic member. The retaining member is formed from a non-magnetic material and has at least one circumferential surface extending about an axis. The rotor has a magnet. The coil has first and second opposite ends adapted to be electrically connected to the source of alternating electrical current.

The present invention provides a motor for use with a source of an alternating electrical current. The motor includes a retaining member having first and second circumferential surface portions located about an axis, a rotor adjacent to the retaining member and having a magnet, a magnetic member proximate the rotor and an electrically conductive coil about the magnetic member. The coil has first and second opposite ends adapted to be electrically connected to the source of alternating electrical current. The first and second circumferential surface portions extend on opposite sides of the axis. The rotor is alternately attracted towards and repelled away from each of the first and second circumferential surface portions in response to alternating electrical current flowing through the coil.

The present invention also provides a method for rotatably driving a rotor having an axial length, an axial midpoint and first and second rotor portions on opposite axial sides of the axial mid-point. The method includes steps of providing a retaining member having first and second circumferential surface portions located about an axis, wherein the first and second circumferential surface portions extend on opposite sides of the axis; positioning the rotor between the first and second circumferential surface portions; and pivoting the rotor about an axis perpendicular to the axis of the retaining member, such that the rotor rotates against the first and second circumferential surface portions about the axis of the retaining member.

The present invention also provides a method for making a motor. The method includes the steps of providing a magnetic member having an axial end, wrapping an electrically conductive coil about the magnetic member, wherein the magnetic member has first and second opposite ends adapted for being connected to a source of an alternating electrical current, molding a mass of non-magnetic material about the magnetic member and the electrically conductive coil to form a body, forming a retaining member having an axis within the body proximate the axial end of the magnetic member and positioning a rotor along the axis of the retaining member.

DETAILED DESCRIPTION OF THE PREFERRED EMBODIMENTS

I. Motor 10

Figure 1:
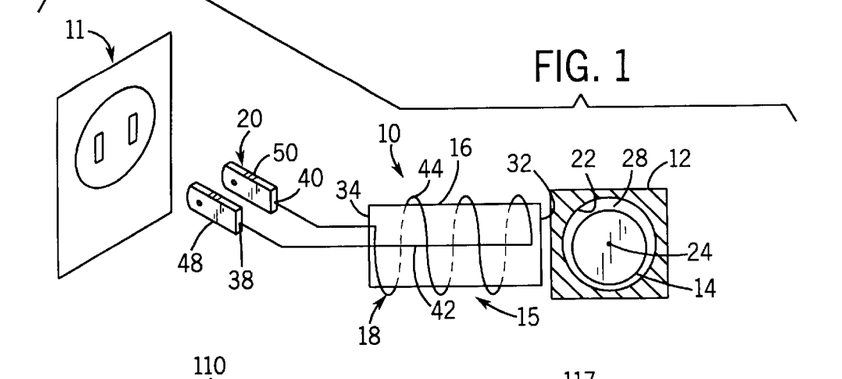
FIG. 1 is a perspective view schematically illustrating an exemplary embodiment of a nutational motor of the present invention for use with an alternating current electrical outlet.

FIG. 1 is a perspective view schematically illustrating motor 10 for use with alternating current electrical outlet 11. Motor 10 generally includes retaining member 12, rotor 14, and a nutational actuator 15 including magnetic member 16, coil 18 and electrical plug 20. The retaining member 12 comprises the portion of motor 10 which remains fixed with respect to nutating rotor 14. Retaining member 12 defines a circumferential surface 22 concentrically extending about axis 24. Surface 22 preferably comprises an inner circumferential surface so as to provide a closed surface pathway against which rotor 14 rotates to nutate about axis 24. In exemplary embodiment, surface 22 defines an inner diameter of a bore in which rotor 14 nutates. Retaining member 12 is made from a non-magnetic material such as a plastic including nylon or high-density polyethylene.

Figure 8:
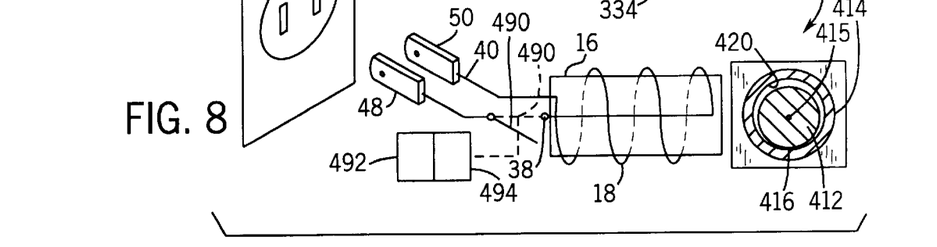
FIG. 8 is a perspective view schematically illustrating a fourth alternative embodiment of the motor of FIG. 1 for use with an alternating current electrical outlet.

Although circumferential surface 22 is illustrated as a continuous inner circumferential surface, circumferential surface 22 may alternatively be composed of several inner arcuate or circumferential segments slightly spaced from one another but sufficiently close so as to surround and retain rotor 14 therebetween. Moreover, circumferential surface 22 may alternatively comprise an outer circumferential surface as illustrated in FIG. 8. Although circumferential surface 22 is illustrated as being smooth, circumferential surface 22 may alternatively be roughened to provide greater friction or may be altered to include teeth for meshing with corresponding teeth provided on rotor 14.

Rotor 14 comprises an elongate shaft preferably connected to a driven component (not shown) such that nutation of rotor 14 rotates the component for a selected purpose. Rotor 14 includes a circumferential surface 28 opposing circumferential surface 22. Surface 28 defines a diameter of rotor 14 which is less than the inner diameter of the bore defined by surface 22. Circumferential surface 28 is configured for rotating against circumferential surface 22. Accordingly, in the embodiment illustrated in FIG. 1, surface 28 is generally smooth or slightly roughened for frictional contact against the generally smooth surface 22. As will be appreciated, when surface 22 includes teeth, surface 28 may likewise include corresponding teeth. Moreover, in alternative embodiments where retaining member 12 includes an outer circumferential surface, rotor 14 preferably includes an inner circumferential surface which is either continuous or segmented and which encircles the outer circumferential surface of retaining member 12.

Rotor 14 additionally includes a magnet which possesses the property of attracting certain substances. In the exemplary embodiment, rotor 14 is formed from a moldable magnetic material. For purposes of this disclosure, the term "magnetic" means a member or material which has a sufficient magnetic susceptibility so as to be capable of being temporarily magnetized to form an electromagnet or capable of being magnetized to form a permanent magnet. In contrast, the term "magnet" means a member or material which already has been magnetized so as to produce a magnetic field, such as an electromagnet or a permanent magnet. The moldable magnetic material includes a powdered magnetic material preferably having a high magnetic susceptibility such as a mixture of aluminum, nickel and cobalt molded with a plastic material to form the structure of rotor 14. The powdered magnetic material encapsulated within the plastic material is then magnetized in a conventionally known manner so as to provide a permanent magnet. The magnet is preferably oriented such that its north and south poles are displaced from one another in a direction along the axis of rotor 14.

Alternatively, rotor 14 may be provided with a distinct permanent magnet which is mounted or otherwise secured to the structure forming rotor 14. Moreover, in lieu of being provided with a permanent magnet, rotor 14 may alternatively be provided with an electromagnet.

Nutational actuator 15 supplies a controlled and varied magnetic field to the magnet of rotor 14 to cause rotor 14 to rotate about axis 24 and to further cause rotor 14 to rotate against circumferential surface 22. Nutational actuator 15 serves this function, yet requires very few components such as magnetic member 16, coil 18 and plug 20. Magnetic member 16 comprises a member of at least one material preferably having a high magnetic susceptibility, such as iron or ferrite, which is capable of being magnetized by an electrical current flowing about member 16 so as to form an electromagnet.

Member 16 has a first end 32 and a second end 34. End 32 is positioned proximate rotor 14 while end 34 is positioned distant rotor 14. Magnetic member 16 conducts or directs magnetic flux created by current flowing through coil 18 across retaining member 12 and rotor 14 to create a dense magnetic field across retaining member 12 and rotor 14 and to thereby cause rotor 14 to rotationally nutate with greater force. Although less desirable, but still somewhat functional, motor 10 may omit magnetic member 16 such the magnetic flux is conducted through the less conductive medium of air across retaining member 12 and rotor 14.

Coil 18 comprises an elongate wire of at least one electrically conductive material, such as copper, having a first end 38 and a second end 40. To prevent electrical shorting across member 16, coil 18 is preferably insulated from member 16 by an electrically insulating sheath about coil 18. Alternatively, coil 18 may be electrically insulated from member 16 by a sheath or bobbin of electrically insulating material about member 16 itself. Alternatively, coil 18 may be spaced about member 16 by air. Coil 18 includes portions 42 and 44. Portion 42 extends from end 38 axially along member 16 from end 34 to end 32. Portion 44 extends from portion 42 to end 40. Portion 44 encircles member 16 from end 32 to end 34 of member 16. Ends 38 and 40 are electrically connected to electrical prongs 48, 50, respectively, of electrical plug 20.

Electrical prongs 48 and 50 of electrical plug 20 are conventionally known and are configured for being inserted into alternating current electrical outlet 11. Electrical prongs 48 and 50 project from the body which supports retaining member 12, magnetic member 16, and coil 18. Alternatively, prongs 48 and 50 may be formed at the end of a conventionally known electrical cord carrying a pair of electrical wires which are electrically connected to ends 38 and 40 of coil 18. As will be further appreciated, the configuration of plug 20 and electrical prongs 48 and 50 may widely vary depending upon the configuration of electrical outlet 11. For example, in addition to including electrical prongs 48 and 50, electrical plug 20 may also include an additional prong for grounding. In alternative applications, plug 20 and electrical prongs 48, 50 may be omitted where ends 38 and 40 are directly electrically connected to an alternating current electrical power source.

In use, electrical prongs 48 and 50 of electrical plug 20 are simply inserted into electrical outlet 11. Outlet 11 supplies electrical prongs 48 and 50 with an alternating electrical current which flows through coil 18 from prong 48 to prong 50 and vice-versa. The alternating electrical current flowing through coil 18 about magnetic member 16 electromagnetizes member 16 such that end portion 32 alternately switches back and forth between a north polarity and a south polarity. In the exemplary embodiment, because electrical outlet 11 provides an alternating current having a frequency of 60 Hertz, end portion 32 of magnetic member 16 alternately exhibits north and south polarities at a frequency of 60 Hertz. As a result, the opposite poles of the magnetic of rotor 14 are alternately attracted to and repelled away from end 32 at a similar frequency. This alternating attraction and repulsion of the magnet of rotor 14 causes rotor 14 to wobble or nutate about axis 24. In particular, the resulting alternating attraction and repulsion of rotor 14 with respect to end 32 initially causes portions of rotor 14 to reciprocate between opposite sides of circumferential surface 22 which are angularly spaced 180 degrees from one another. However, during this reciprocation of rotor 14, rotor 14 has a tendency to become off-centered such that rotor 14 begins reciprocating between portions of surface 22 which are less than 180 degrees apart and which are not directly opposite one another. Consequently, the alternating attraction and repulsion of rotor 14 causes rotor 14 to roll against circumferential surface 22 and to nutate about axis 24.

To ensure that rotor 14 becomes off-centered during reciprocation, the magnetic field attracting and repelling rotor 14 must be weak enough given the mass of rotor 14 and the relative diameters of retaining member 12 and rotor 14 to enable rotor 14 to become sufficiently off-centered such that rotor 14 rolls against surface 22. As will be appreciated, the magnetic field strength, the mass of rotor 14 and the relative diameters of retaining member 12 and rotor 14 may have any of a variety of different values while still enabling rotor 14 to become off-centered during reciprocation. For example, the magnetic field strength, which is a function of the electrical amperage and the number of turns which coil 118 encircles magnetic member 16, may be increased and decreased as the mass of rotor 14 is correspondingly increased and decreased. As the mass of rotor 14 is increased, the difference between the diameters of retaining member 12 and 14 should preferably be correspondingly decreased. As will further be appreciated, the precise frequency at which rotor 14 is alternately attracted to or repelled away from end 32 will depend upon the frequency of the alternating current provided by electrical outlet 11. The speed at which rotor 14 rotates is dependent upon the frequency at which rotor 14 is attracted and repelled, and the relative diameters of retaining member 12 and rotor 14.

As shown by FIG. 1, motor 10 requires very few parts. In contrast to prior nutational motors which required a stator having multiple magnetic lands about the rotor, a position sensor and an electrical sequencer for sequentially magnetizing the lands, motor 10 merely requires a retaining member made of any non-magnetic material which provides a circumferential surface, a rotor having a magnet and a nutational actuator consisting of a single magnetic member 16 and a single electrical coil 18 extending about the magnetic member 16 and having ends electrically connected to electrical prongs 48 and 50 of an electrical plug 20. Magnetic member 16 and coil 18 form a stator. As a result, retaining member 12, rotor 14 and the nutational actuator 15 of motor 10 each may be easily and inexpensively manufactured. Moreover, due to its relatively few and inexpensive components, motor 10 is also relatively compact and space saving. Thus, motor 10 is well adapted for low-cost applications such as small consumer products and one-time use products.

II. Motor 110

FIGS. 24 illustrate motor 110, a first alternative embodiment of motor 10 shown in FIG. 1. Motor 110 is specifically configured for driving propeller 117 and incorporates the basic schematically illustrated elements of motor 10. Motor 110 generally includes body 111, retaining member 112, magnet 113, rotor 114, and nutational actuator 115 including magnetic member 116, coil 118, and electrical plug 120. Body 111 comprises a block of material which serves as a base for supporting retaining member 112, magnetic member 116, coil 118 and electrical plug 120. In the exemplary embodiment, body 111 is made of non-magnetic material, such as nylon or high density polyethylene (HDPE). Body 111 substantially surrounds retaining member 112 and the components of the nutational actuator 115. Body 111 is configured for being positioned adjacent the electrical outlet 11.

Figure 2:
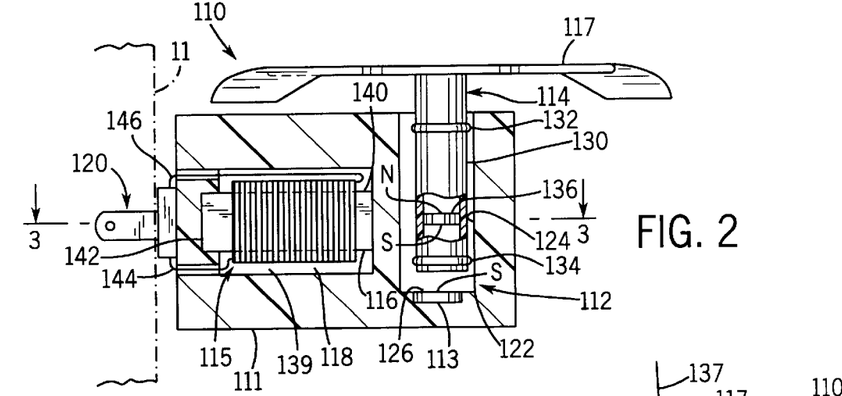
FIG. 2 is a sectional view of a first alternative embodiment of the motor of FIG. 1 plugged in the alternating current electrical outlet.
Figures 3, 4:
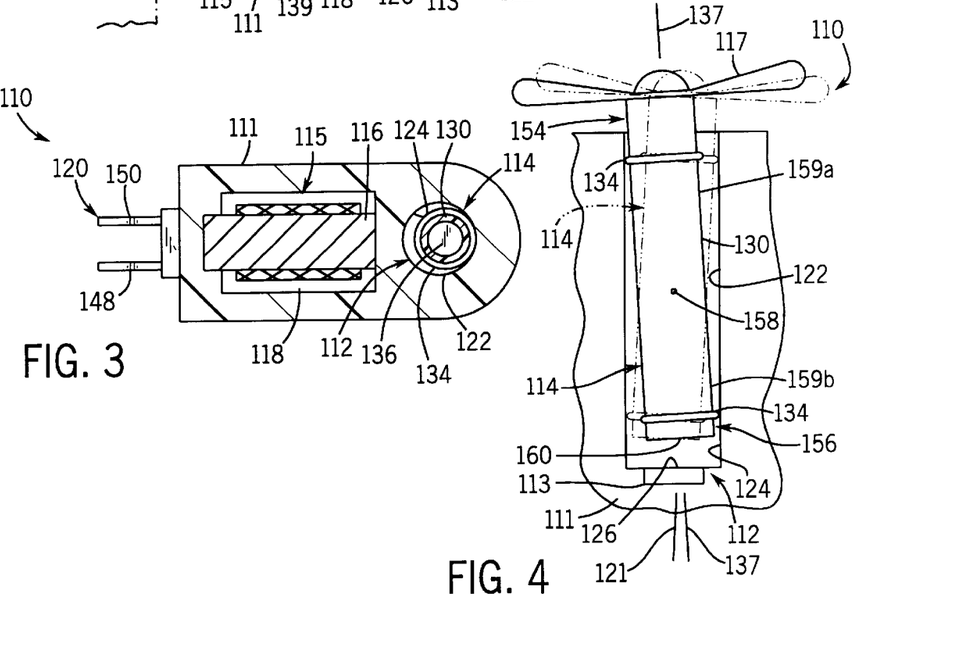
FIG. 3 is a sectional view of the motor of FIG. 2 taken along lines 3—3.
FIG. 4 is a sectional view illustrating a rotor nutating about an axis of a retaining member of the motor of FIG. 2.

Retaining member 112 generally consists of an elongate cylindrical bore 122 concentrically extending about axis 121. Bore 122 has a diameter greater than the diameter of rotor 114. Bore 122 preferably extends into body 111 on an end opposite electrical plug 120. Alternatively, bore 122, forming retaining member 112, may extend into a separate structure which is mounted to body 111. Bore 122 provides a continuous and relatively smooth inner circumferential surface 124 against which rotor 114 nutates as shown in FIG. 4.

Magnet 113 comprises a component made of magnetic material which attracts and repels magnetic substances. Magnet 113 preferably comprises a permanent magnet. Alternatively, magnet 113 may comprise an electromagnet. Magnet 113 is preferably situated at bottom 126 of bore 122 and is oriented so as to repel magnet 136 of rotor 114. Magnet 113 elevates rotor 114 within bore 122 to reduce frictional contact therebetween. In most applications, magnet 113 may be omitted.

Rotor 114 nutates within bore 122 of retaining member 112 and generally includes shaft 130, rings 132, 134, and magnet 136. Shaft 130 is a generally elongate hollow tubular shaft extending along axis 137 and having an outer diameter less than the inner diameter of bore 122. Shaft 130 is fixedly secured to propeller 117 such that nutation of shaft 130 causes rotation of propeller 117.

Rings 132 and 134 circumscribe shaft 130 at spaced locations along shaft 130. Rings 132 and 134 have an outer diameter less than the inner diameter of bore 122 so as to enable rotor 114 to nutate within bore 122. In the exemplary embodiment, the ratio of the diameter of bore 122 to the outer diameter of rings 132 and 134 is approximately 1.2 to 1. It has been found that as the mass of rotor 114 increases, the optimal ratio of the diameter of bore 122 to the diameter of rings 132 and 134 decreases. Rings 132 and 134 have a high coefficient of friction and are also preferably compressible. Rings 132 and 134 frictionally contact inner circumferential surface 124 to facilitate nutation of rotor 114. Because rings 132 and 134 are additionally compressible, rings 132 and 134 reduce vibration and noise. Rings 132 and 134 preferably comprise conventionally known rubber O-rings which are inset within outer circumferential grooves (not shown) formed in the outer circumferential surface of shaft 130. As will be appreciated, rings 132 and 134 may be integrally formed as part of shaft 130 or may be fastened to shaft 130 by various other well-known fastening means. Moreover, the outer circumferential surface of rotor 114 may be formed out of a material, such as rubber, which has a relatively high co-efficient of friction and which is resiliently compressible.

Magnet 136 comprises a permanent magnet carried by shaft 130 within the hollow interior of shaft 130. Magnet 136 has north and south poles, N, S, displaced from one another in a direction along the axis of shaft 130. The lower portion of magnet 136 has the same polarity as the upper portion of magnet 113. As a result, magnet 136 repels magnet 113 to elevate shaft 130 above bottom 126 of bore 122. Magnet 136 further interacts with magnetic member 116 to cause nutation of rotor 114 once plug 120 is inserted into outlet 11. Although magnet 136 is illustrated as a separate magnetic component secured within the hollow interior of shaft 130, magnet 136 may alternatively be secured along the outside of shaft 130 or may be integrally formed as part of a single unitary body with shaft 130. For example, shaft 130 may be formed from moldable magnetic materials such as aluminum, nickel and cobalt which are powdered and molded in plastic to form rotor 114 or a portion of rotor 114, wherein the powdered magnetic material carried within the plastic material of the rotor is magnetized to form a permanent magnet. In lieu of comprising a permanent magnet, magnet 136 may alternatively comprise an electromagnet.

Magnetic member 116, coil 118 and electrical plug 120 serve as nutational actuator 115 for nutating rotor 114 about axis 121 of retaining member 112 to rotate propeller 117. Magnetic member 116 comprises an elongate piece of magnetic material which is capable of being magnetized or attracted by a magnet. In the exemplary embodiment, member 116 is made of ferrite. As will be appreciated, other alternative magnetic materials may also be utilized. Magnetic member 116 is supported within a hollow cavity 139 within body 111 and includes an end portion 140 proximate rotor 114 and an opposite end portion 142 distant rotor 114. Magnetic member 116 is magnetized by alternating current flowing through coil 118.

Coil 118 is a single elongate continuous electrically insulated wire of electrically conductive material, such as copper, wrapped about magnetic member 116 and having first and second ends 144 and 146 electrically connected to first and second prongs 148 and 150 of electrical plug 120.

Upon electrical prongs 148 and 150 of electrical plug 120 being inserted into an alternating current electrical outlet 11, alternating electrical current flows through prongs 148, 150 and coil 118. The electrical current flowing through coil 118 creates a magnetic flux which is conducted through magnetic member 116. The magnetic flux forms a magnetic field which extends from end portion 140 through retaining member 112 and rotor 114 and around to end portion 142 of magnetic member 116. As a result, magnet 136 aligns itself with the magnetic field flowing through retaining member 112. Because magnet 136 is axially spaced above the bottom of rotor 114, the alignment of magnet 136 with the magnetic field levitates rotor 114 above the bottom of bore 122 to eliminate frictional contact therebetween during nutation and rotation of rotor 114.

As the current flowing through coil 118 switches direction, end portion 140 of magnetic member 116 changes in polarity. This change in polarity alternately attracts and repels magnet 136 of rotor 114. Because the diameter of bore 122 is greater than the outer diameter of rings 132 and 134, as well as shaft 130, rotor 114 nutates about axis 121 within bore 122 against the inner circumferential surface 124 of retaining member 112. As further shown by FIG. 4, during nutation, rotor 114 gyrates about its center of mass 158 and spins about axis 137. Rotor 114 also pivots about multiple axes extending through the center of mass 158 and extending perpendicular to axis 121. Consequently, portions 159*a* 159*b* located on opposite axial ends of rotor 114 are alternately and intermittently forced or moved towards opposite portions of circumferential surface 124 as indicated with phantom lines. Because surface 124 is at least partially circumferential and because the diameters of rotor 114 and bore 122 are appropriately sized given the mass of rotor 114, the pivoting of rotor 114 causes rotor 114 to roll against circumferential surface 124. Although top portion 154 and bottom portion 156 of rotor 114 rotate in generally the same direction, top portion 154 and bottom portion 156 rotate on opposite sides of the axis 121 of retaining member 112. This is believed to be due to the fact that magnet 136 of rotor 114 has north and south poles which are axially spaced from the center of mass. Such a condition occurs when both the north and south poles are located on one side of the center of mass or when the north and south poles are axially spaced from one another on opposite sides of the center of mass. Because rotor 114 gyrates about its center of mass and pivots about an axis substantially perpendicular to axis 121, less force is required to nutationally rotate rotor 114. Thus, rotor 114 more easily nutationally rotates about axis 121.

III. Motor 210

Figure 5:
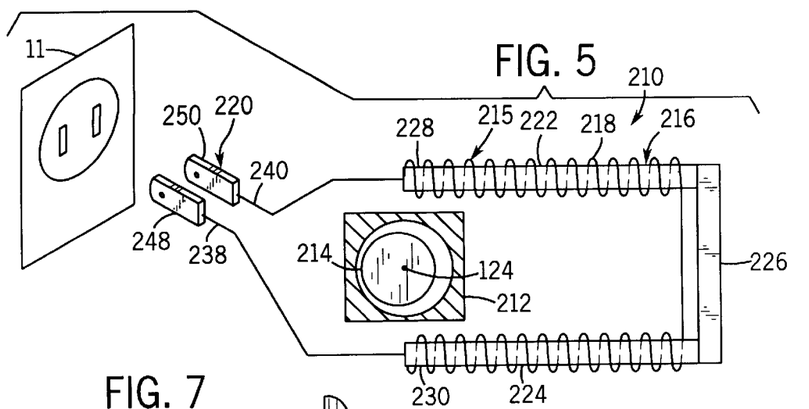
FIG. 5 is a perspective view schematically illustrating a second alternative embodiment of the motor of FIG. 1 for use with an alternating current electrical outlet

FIG. 5 is a perspective view schematically illustrating motor 210, a second alternative embodiment of motor 10. Motor 210 generally includes retaining member 212, rotor 214 and nutational actuator 215 comprising magnetic member 216, electrically conductive coil 218 and electrical plug 220. Retaining member 212 and rotor 214 are substantially identical to retaining member 12 and rotor 14 of motor 10. Magnetic member 216 is similar to magnetic member 16 of motor 10 except that magnetic member 216 includes legs 222, 224, and connector 226. Legs 222 and 224 comprise elongate members made of a material preferably having a high magnetic susceptibility, such as ferromagnetic materials including ferrite, cobalt, nickel and gadolinium, among others. Legs 222 and 224 include end portions 228, 230, respectively, which are positioned on opposite sides of rotor 214 and are angularly spaced from one another by approximately 180 degrees. Legs 222 and 224 are interconnected to one another by connector 226. Connector 226 comprises an elongate bar of material having a high magnetic susceptibility, such as a ferromagnetic material. Connector 226 extends between legs 222 and 224. Connector 226 conducts magnetic flux across legs 222 and 224 when magnetic member 216 is magnetized by alternating current flowing through coil 218. Although connector 226 is illustrated as a separate component mounted to axial ends of legs 222 and 224, connector 226 may be mounted so that it extends anywhere along the axial length of legs 222 and 224 between legs 222 and 224 with coil 318 positioned between connector 226 and rotor 214. Moreover, connector 226 may be integrally formed as a part of a single unitary body with legs 222 and 224 so that magnetic member 216 has a horse-shoe shape. Although less desirable, connector 226 may alternatively be omitted such that magnetic flux is conducted through the air between legs 222 and 224. Although even less desirable, magnetic member 216 may be omitted in its entirety such that the magnetic flux created by coil 218 flows through the less conductive medium of air across retaining member 212 and rotor 214.

Electrically conductive coil 218 is substantially identical to electrically conductive coil 18 of motor 10 except that electrically conductive coil 218 encircles both legs 222 and 224. As shown by FIG. 5, electrically conductive coil 218 has first and second opposite ends 238 and 240 which are electrically connected to electrical prongs 248 and 250 of electrical plug 220. Alternatively, ends 238 and 240 may be directly electrically connected to an alternating current electrical power source. Extending from end 238, electrically conductive coil 218 encircles leg 224, extends across to leg 222 and encircles leg 222 prior to terminating at end 240. Coil 218 encircles legs 222 and 224 in opposite directions.

When electrical prongs 248 and 250 of plug 220 are inserted into alternating current electrical outlet 11, the electric current flowing through coil 218 oppositely magnetizes legs 222 and 224. For example, at a first point in time, the electrical current flowing through coil 218 will provide end portion 228 of leg 222 with a north polarity while at the same time providing end portion 230 of leg 224 with a south polarity. As a result, the electrical current flowing through coil 218 oppositely magnetizes legs 222 and 224 so as to create a magnetic field from end portion 228 through retaining member 212 and rotor 214 to end portion 230. This magnetic field is most dense along the linear path connecting end portions 228 and 230. Because end portions 228 and 230 are angularly spaced 180 degrees from one another on opposite sides of the axis 121 of retaining member 212, rotor 214 is attracted to one of end portions 228 and 230 and repelled away from the other of end portions 228 and 230 at the first point in time. Because the electrical current from outlet 11 is alternating, the polarity of end portions 228 and 230 of magnetic member 216 will alternate between the north and south polarities at a frequency equal to the frequency of the alternating current. For example, if electrical outlet 11 is at 60 Hertz, end portions 228 and 230 will switch between a north and south polarity with a frequency of approximately 60 times per second. As a result, rotor 214 will be attracted to end portion 228 and then repelled away from end portion 228 to cause rotor 214 to nutate about axis 121 of retaining member 212.

In particular, the resulting alternating attraction and repulsion of rotor 214 with respect to end portions 228 and 230 initially causes portions of rotor 214 to reciprocate between opposite sides of the circumferential surface portions of retaining member 212 which are angularly spaced 180 degrees from one another. However, during this reciprocation of rotor 214, rotor 214 has a tendency to become off-centered such that rotor 214 begins reciprocating between portions of the circumferential surface which are not directly opposite one another. Consequently, the alternating attraction and repulsion of rotor 214 causes rotor 214 to roll against the inner circumferential surface and to nutate about axis 121. To ensure that rotor 214 becomes off-centered during reciprocation, the magnetic field attracting and repelling rotor 214 must be weak enough given the mass of rotor 214 and the relative diameters of retaining member 212 and rotor 214 to enable rotor 214 to become sufficiently off-centered. As will be appreciated, the magnetic field strength, the mass of rotor 214 and the relative diameters of retaining member 212 and rotor 214 may have any of a variety of different values while still enabling rotor 214 to become off-centered during reciprocation. Because rotor 214 is simultaneously attracted and then repelled in alternating directions between opposite sides of axis 121, rotor 214 nutates with greater force to provide greater torque.

IV. Motor 310

Figure 6:
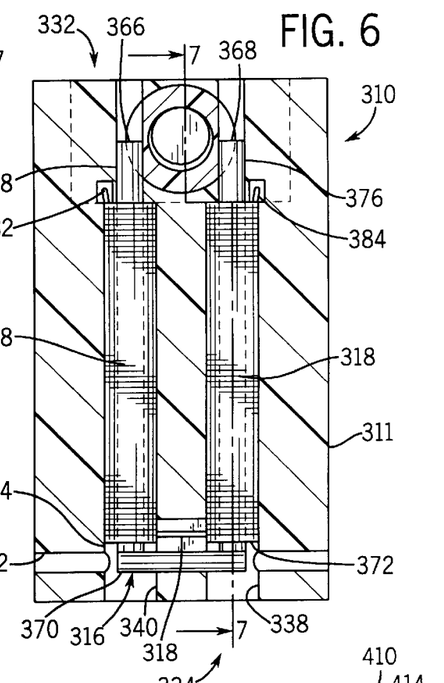
FIG. 6 is a sectional view of a third alternative embodiment of the motor of FIG. 1 plugged in the alternating current electrical outlet.
Figure 7:
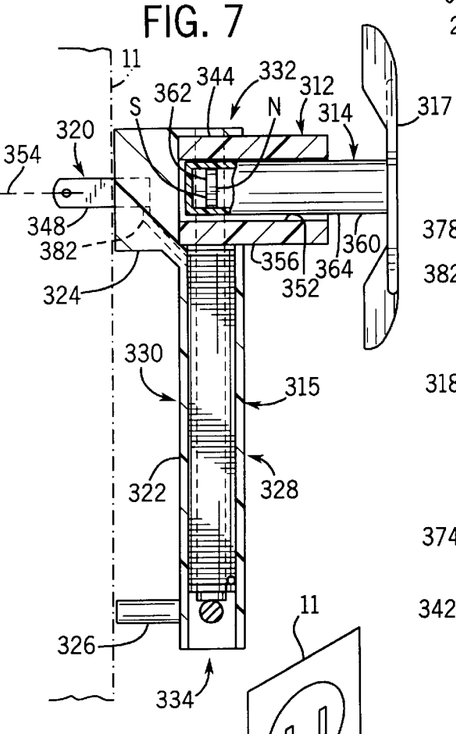
FIG. 7 is a sectional view of the motor of FIG. 6 taken along lines 7—7.

FIGS. 6 and 7 illustrate motor 310, a third alternative embodiment of motor 10 shown in FIG. 1. Motor 310 is a preferred embodiment which incorporates several of the basic schematically illustrated elements of motor 210 and which is specifically adapted for driving propeller 317. Motor 310 generally includes body 311, retaining member 312, rotor 314 and nutational actuator 315 comprising magnetic member 316, coil 318 and electrical plug 320. Body 311 serves as a base for supporting retaining member 312 and the nutational actuator 315. In the exemplary embodiment, body 311 includes platform 322, prong support 324 and stand-off 326. Platform 322 supports retaining member 312, magnetic member 316 and coil 318. In the exemplary embodiment, platform 322 is a generally rectangular member having a front 328, a rear 330, a head end 332 and a tail end 334. Platform 322 generally includes a pair of parallel cavities 338, 340, a transverse cavity 342 and retaining member receiving cavity 344. Cavities 338 and 340 extend through platform 322 from tail end 334 to head end 332. As best shown in FIG. 6, cavities 338 and 340 have a narrower diameter at head end 332 adjacent retaining member receiving cavity 344. Transverse cavity 342 extends through platform 322 across cavities 338 and 340. Cavities 338, 340 and 342 receive and house magnetic member 316 and coil 318. Retaining member receiving cavity 344 extends into front 328 of platform 322 at head end 332. Retaining member receiving cavity 344 receives retaining member 312.

Prong support 324 rearwardly projects from platform 322 at head end 332. Prong support 324 supports plug 320. Plug 320 is identical to plug 220 and includes electrical prongs 348 and 250 (shown in FIG. 5). Prongs 248 and 250 project from support 324 at spaced positions for insertion into electrical outlet 11. As a result, plugging motor 310 into outlet 11 simultaneously mounts motor 310 to the wall or other surface surrounding outlet 11. In exemplary embodiment, prong support 324 is preferably molded about the prongs of plug 320.

Standoff 326 comprises at least one leg rearwardly projecting from platform 322 at tail end 334 by a distance equal to the width of prong support 324. Standoff 326 spaces platform 322 from electrical outlet 11 and maintains platform 322 parallel to electrical outlet 11 and the adjacent wall or other structure. In the exemplary embodiment, platform 322, prong support 324 and standoff 326 are integrally formed as part of single unitary body. Alternatively, platform 322, prong support 324 and standoff 326 may be formed as separate components connected to one another.

Retaining member 312 comprises a portion of motor 310 which remains fixed with respect to nutating rotor 314. In the exemplary embodiment, retaining member 312 provides an inner circumferential surface 352 concentrically extending about an axis 354 about which rotor 314 nutates. Retaining member 312 preferably includes an annular liner or sleeve 356 press fit or otherwise fastened within retaining member supporting cavity 344 of platform 322. Sleeve 356 is preferably made of a compressible material, such as rubber. As a result, during nutation of rotor 314, sleeve 356 increases friction, dampens vibration and reduces noise. As will be appreciated, various other compressible materials may be employed. In addition, sleeve 356 may alternatively have an outer rigid portion lined with a soft compressible inner portion. As discussed above with respect to retaining member 12 of motor 10, retaining member 312 may alternatively comprise a plurality of segments which provide an inner-circumferential surface 352 or may alternatively provide an outer circumferential surface about which rotor 314 nutates.

Rotor 314 is fastened to propeller 317 and generally includes shaft 360 and magnet 362. Shaft 360 comprises a hollow tubular shaft preferably made of a non-magnetic material such as high density polyethylene or nylon. Shaft 360 includes an outer circumferential surface 364 opposite inner circumferential surface 352 of retaining member 312. Shaft 360 has an outer diameter less than the inner diameter of retaining member 312 defined by inner circumferential surface 352. In the exemplary embodiment, the ratio of the inner diameter of the bore of retaining member 312 to the outer diameter shaft 360 is approximately 1.2 to 1. It has been found that as the mass of rotor 314 and the attached component are increased, the ratio of the inner diameter of the bore of retaining member 312 to the outer diameter of shaft 360 should be decreased.

Magnet 362 preferably comprises a permanent magnetic carried within the hollow interior of shaft 360. The magnet 362 is preferably oriented such that its opposite poles are displaced relative to one another along the axis of rotor 314. In particular, magnet 362 is oriented so as to have a first pole facing front 328 and a second pole facing rear 330 of platform 322. As will be appreciated, magnet 362 may alternatively extend along an outer surface of shaft 360 or may be integrally formed as part of a single unitary body with shaft 360. For example, shaft 130 may be formed from moldable magnet materials such as aluminum, nickel and cobalt which are powdered and molded in plastic to form rotor 114 or a portion of rotor 114, wherein the powdered magnetic material carried within the plastic material of the rotor is magnetized to form a permanent magnet. In addition, in lieu of comprising a permanent magnet, magnet 362 may comprise an electromagnet. Magnet 362 interacts with the magnetic forces generated by the nutational actuator 315 to cause rotor 314 to nutate against circumferential surface 352 of retaining member 312 about axis 354.

Magnetic member 316 generally includes cores or legs 366, 368, connector 370 and electrical insulators 372, 374. Legs 366, 368 and connector 370 are substantially identical to legs 222, 224 and connector 226 of motor 210. Legs 366 and 368 extend through cavities 338 and 340, respectively, and include end portions 376 and 378 which project on opposite sides of retaining member 312 and are angular spaced approximately 180 degrees from one another. End portions 376 and 378 are preferably located so as to extend within a common plane coextensive with magnet 362. Connector 370 is inserted through cavity 342 and in contact with legs 366 and 368. Connector 370 transmits magnetic flux between legs 366 and 368.

Electrical insulators 372 and 374 extend between legs 366 and 368 and coil 318. Electrical insulators 372 and 374 preferably comprise electrical insulating bobbins. Insulators 372 and 374 prevent electrical short circuiting across leg 366 or leg 368.

Coil 318 is substantially identical to coil 218 of motor 210. Coil 318 includes first and second ends 382 and 384 which are electrically connected to electrical prongs 348 and 350, respectively. Coil 318 extends from end 382, encircles insulator 374 and leg 366, extends from leg 366 to leg 368, and encircles insulator 372 and leg 368 before terminating at end 384.

As with motor 210, when plug 320 is inserted into alternating current electrical outlet 11, alternating electrical current will flow through coil 318 about legs 366 and 368 to oppositely electromagnetize legs 366 and 368. Because the electrical current from outlet 11 is alternating, the polarities of end portions 376 and 378 alternate between north and south polarities at a frequency equal to the frequency of the alternating current. As a result, opposite poles of magnet 362 of rotor 314 will be attracted to end portion 376 and then repelled away from end portion 376 to cause rotor 314 nutate about axis 354 of retaining member 312.

Although each of motors 10, 110, 210 and 310 are illustrated as having retaining members including an inner circumferential surface which is made entirely of a non-magnetic material, each of motors 10, 110, 210 and 310 may alternatively be provided with a retaining member having an inner circumferential surface which is only partially formed from a non-magnetic material. For example, the inner circumferential surfaces of the retaining members of motors 10, 110, 210 and 310 may have portions closest to magnetic members 16, 116, 216 and 316 which are made from a material having a high magnetic susceptibility. Such magnetic portions may be positioned in contact with or integrally formed as part of magnetic members 16, 116, 216 and 316 so long as such magnetic portions of the inner circumferential surface of each retaining member are separated or spaced from one another or from the opposite side of the base of the retaining member by non-magnetic material such that the strongest portion of the magnetic field passes through the axis defined by the retaining member and across the rotor. Although such an embodiment is contemplated, such an embodiment is not preferred for reasons of complexity and manufacturing cost.

V. Motor 410

FIG. 8 is a perspective view schematically illustrating motor 410, a fourth alternative embodiment of motor 10. Motor 410 is substantially similar to motor 10, except that motor 410 includes retaining member 412 and rotor 414 in lieu of retaining member 12 and rotor 14. Motor 410 additionally includes electrical switch 490, timer 492 and actuator 494. For ease of illustration, those remaining elements of motor 410 which correspond to elements of motor 10 are numbered similarly. Retaining member 412 comprises an elongate spindle or shaft concentrically extending along axis 415 and fixed or stationary relative to rotor 414. Retaining member 412 has a diameter defined by outer circumferential surface 416. Outer circumferential surface 416 provides a closed surface pathway against which rotor 414 rotates to nutate about axis 415.

Although surface 416 is illustrated as a continuous outer circumferential surface, surface 416 may alternatively be composed of several outer circumferential segments slightly spaced from one another or sufficiently close so as to retain rotor 414 thereabout. Furthermore, although circumferential surface 416 is illustrated as being smooth, circumferential surface 416 may alternatively be roughened to provide greater friction or could be altered to include teeth from meshing with corresponding teeth provided on rotor 414.

Rotor 414 comprises a capped annular member, such as a tube or sleeve, having an inner diameter greater than the outer diameter of retaining member 412 and having an inner circumferential surface 420 opposite outer circumferential surface 416 of retaining member 412. Circumferential surface 420 is configured for rotating against circumferential surface 416. Accordingly, in the embodiment illustrated, surface 420 is generally smooth or roughened for frictional contact against the surface 416. As will be appreciated, when surface 416 includes teeth, surface 420 may likewise include corresponding teeth. Moreover, in lieu of comprising a continuous inner circumferential surface, surface 420 may alternatively be composed of several segments which are spaced sufficiently close to one another so as to retain rotor 414 about retaining member 412 during rotation and nutation of rotor 414.

Rotor 414 includes a magnet which interacts with magnetic member 16. The magnet of rotor 414 comprises a magnet which possesses the property of attracting certain substances. In particular, the magnet comprises a permanent magnet. Alternatively, the magnet may comprise a magnetic material which is electromagnetized.

Electrical switch 490 comprises a conventionally known component connected to coil 18 so as to selectively interrupt the flow of current between prongs 48 and 50 through coil 18. Switch 490 is movable between a first disengaged position (as shown in FIG. 8) to a second disengaged position (as shown in phantom). In the disengaged position, switch 490 interrupts the flow of electrical current from electrical prong 48 to electrical prong 50 through coil 318. As a result, magnetic member 16 is not magnetized and the nutation of rotor 414 about axis 415 of retaining member 412 is terminated even when electrical prongs 48 and 50 are plugged into electrical outlet 11. As a result, switch 490 enables motor 410 to be shut off by moving switch 490 to the disengaged position while leaving motor 410 plugged into outlet 11.

In the engaged position (shown in phantom), switch 490 electrically connects both ends of coil 18 to electrical prongs 48 and 50. As a result, when electrical prongs 48 and 50 are inserted into alternating current electrical outlet 11, the alternating electrical current is conducted from one of prongs 48, 50 through coil 18 about magnetic member 16 and through the other of electrical prongs 48, 50. The alternating electrical current flowing through coil 18 about magnetic member 16 electromagnetizes member 16 such that end portion 32 alternatively switches back and forth between a north and a south plurality. Consequently, the magnet of rotor 414 is alternatively attracted to and repelled away from end 32. This alternating attraction and repulsion of rotor 414 causes rotor 414 to wobble or nutate about axis 415 of retaining member 412. As will be appreciated, the precise frequency at which rotor 414 is alternately attracted to or repelled away from end 32 will depend upon the frequency of the alternating current provided by electrical outlet 11.

Timer 492 and actuator 494, schematically illustrated in FIG. 8, are each conventionally known components. Actuator 494 preferably comprises solenoid or other electrically activated actuator connected to switch 490. Actuator 494 moves switch 490 between the disengaged and the engaged positions.

Timer 492 comprises a conventionally known timing device or control circuit connected to actuator 494. Timer 492 is programmed or configured to generate a control signal which is transmitted to actuator 494. Actuator 494 moves switch 490 between the disengaged and engaged positions at selected times or time intervals to selectively actuate motor 410 based upon the control signals generated by timer 492.

As will be appreciated, various conventionally known timers and actuators may be utilized with motor 410. Moreover, in lieu of being actuated by timer 492 and actuator 494, switch 490 may alternatively be manually actuated between the disengaged position and the engaged position. In addition, motor 410 may be stopped or started by simply unplugging or plugging in motor 410.

V. Conclusion

In conclusion, each of motors 10, 110, 210, 310 and 410 provides an electrically driven motor which has fewer parts, which is compact, and which can be easily manufactured at a low cost. This is due largely to the fact that each of motors 10, 110, 210, 310 and 410 eliminates the need for a relatively complex stator having multiple magnetic lands, eliminates the need for a position sensor, and eliminates the need for an electrical sequencer for sequentially magnetizing the multiple lands. In contrast, each of motors 10, 110, 210, 310, and 410 simply utilize a nutational actuator consisting of at least one ferromagnetic member proximate the rotor and an electrical coil encircling the ferromagnetic member, wherein the coil has first and second ends electrically connected to electrical prongs adapted for insertion into an alternating current electrical outlet. Consequently, motors 10, 110, 210, 310 and 410 are well adapted for use in applications such as small consumer products and one-time use products.

In addition to eliminating the need for multiple magnetic lands, a position sensor and an electrical sequencer, motors 10, 110, 210, 310 and 410 also enable a retaining member to be more easily formed and enable the remaining components to be easily secured in place adjacent the retaining members. As discussed above, retaining members 12, 112, 212, 312 and 412 are preferably made from a nonmagnetic material. As a result, each of retaining members 12, 112, 212, 312 and 412 may be integrally formed as part of a single unitary body with the base or body supporting the remaining stationary components of the motor such as magnetic members 16, 116 and 316; coils 18, 118, 218 and 318; and the electrical prongs. As a result, part numbers are reduced and the manufacture of the motor is simplified.

Moreover, motors 10, 110, 210, 310 and 410 are well adapted for manufacture without extensive assembly and without the need for fasteners, adhesives and the like. Each of motors 110 and 310 have bodies 111 and 311, respectively, include bores for receiving the magnetic members and the coils. Alternatively, bodies 111 and 311 may be molded about the magnetic members and the electrical coils to simplify manufacturing and assembly. For example, motor 110 may be easily made by providing a magnetic member 116, wrapping an electrically conductive coil 118 about member 116 and connecting the ends of coil 118 to a pair of appropriately spaced electrical prongs 48, 50 and molding a mass of nonmagnetic material about magnetic member 116, coil 118 and electrical prongs 48, 50 to form body 111 and to simultaneously encapsulate magnetic member 116, coil 118 and prongs 48 and 50 in place. Bore 122 providing retaining member 112 may either be molded or may be drilled once body 111 is molded. Likewise, motor 310 may be formed by providing a magnetic member 316 having a pair of legs 366, 368 connected by connector 370, wrapping an electrically conductive strands or wire about legs 366 and 368 to form coil 318, connecting the opposite ends of coil 318 to appropriately spaced electrical prongs and molding a mass of nonmagnetic material, such as a plastic including nylon or high-density polyethylene about magnetic member 316, coil 318 and the electrical prongs to form body 311. Once again, the bore forming retaining member 312 may be either formed during the molding of body 311 or may be later formed by excavating material such as by drilling. Thus, motors 10, 110, 210 and 410 are well adapted to mass production without extensive or complex assembly, further enabling motors 10, 110, 210 and 410 to be used in application such as small consumer products and one-time use products.

Motors 10, 110, 210, 310 and 410 depict several preferred embodiments wherein each embodiment has unique features. As will be appreciated, the features described and illustrated with respect to one particular embodiment may additionally be incorporated in any of the other embodiments. For example, although motors 110 and 310 are illustrated as having prongs integrally formed as part of the body of the motors, motors 110 and 310 may alternatively have plugs connected to conventionally known electrical cords having wires electrically connected to coils 118 and 318, respectively. Motors 10, 110, 210 and 310 may additionally include an electrical switch 490 as well as the timer device 492 and actuator 494 described and discussed with respect to motor 410. Various other alternative combinations of features are also envisioned.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A motor for use with an alternating current electrical outlet, the motor comprising:
   a retaining member having at least one circumferential surface extending about an axis;
   a rotor adjacent to the retaining member, the rotor having a magnet;
   a magnetic member proximate the rotor;
   an electrically conductive coil about the magnetic member, wherein the magnetic member and the electrically conductive coil form a stator, the coil having first and second opposite ends; and
   a first prong configured for insertion into the electrical outlet and electrically connected to the first end of the coil, and a second prong configured for insertion into the electrical outlet and electrically connected to the second end of the coil, whereby alternating current flowing through the coil causes the rotor to nutate about the axis defined by the retaining member, wherein the retaining member is integrally formed as part of a unitary structure supporting the magnetic member.

2. The motor of claim 1 wherein the magnet comprises a permanent magnet.

3. The motor of claim 1 wherein the rotor extends along a rotor axis and wherein the magnet include first and second poles displaced from one another in a direction along the rotor axis.

4. The motor of claim 1 wherein the at least one circumferential surface comprises at least one outer circumferential surface extending about the axis.

5. The motor of claim 1 wherein the at least one circumferential surface comprises at least one inner circumferential surface extending about the axis.

6. The motor of claim 1 including a body supporting said at least one magnetic member, the body having a cylindrical bore defining the inner circumferential surface surrounding the rotor.

7. The motor of claim 1 wherein the at least one circumferential surface is resiliently compressible.

8. The motor of claim 1 wherein the at least one circumferential surface has a high coefficient of friction.

9. The motor of claim 1 wherein the at least one circumferential surface is made of a rubber material.

10. The motor of claim 1 including a body, wherein the body supports the first and second prongs, whereby the motor is adapted for being mounted adjacent the electrical outlet.

11. The motor of claim 1 wherein said at least one magnetic member comprises a single magnetic member having an end portion proximate the rotor.

12. The motor of claim 1 wherein said at least one magnetic member includes first and second end portions angularly spaced approximately 180 degrees from one another on opposite sides of the axis.

13. The motor of claim 1 wherein the rotor comprises a hollow tubular shaft.

14. The motor of claim 13 wherein the hollow tubular shaft is made of a plastic material which carries the magnet.

15. The motor of claim 1 wherein the rotor comprises a shaft including a moldable magnetic material which is molded in plastic and magnetized.

16. The motor of claim 1 including a switch electrically coupled to the coil, wherein the switch is movable between a first disengaged position in which the coil is electrically disconnected from at least one of the first and second prongs and a second engaged position in which the first end of the coil is electrically connected to the first prong and the second end of the coil is electrically connected to the second prong.

17. The motor of claim 16 including an actuator coupled to the switch for moving the switch between the first disengaged position and the second engaged position.

18. The motor of claim 17 including a timer operably coupled to the actuator, wherein the timer is configured to generate a control signal and wherein the actuator moves the switch between the first disengaged position and the second engaged position based upon the control signal.

19. The motor of claim 17 wherein the at least one circumferential surface of the rotor has a high coefficient of friction.

20. The motor of claim 17 wherein the at least one circumferential surface of the rotor is made of a rubber material.

21. The motor of claim 1 wherein the rotor includes at least one circumferential surface opposite the at least one circumferential surface of the retaining member, wherein the at least one circumferential surface of the rotor is resiliently compressible.

22. The motor of claim 1 wherein the magnet of the rotor has a first portion with a first polarity and a second portion with a second opposite polarity, wherein the motor includes a retaining member magnet supported by the retaining member adjacent the rotor, wherein the retaining member magnet includes a third portion facing the second portion of the magnet of the rotor, wherein the third portion has the second polarity so as to repel the rotor.

23. The motor of claim 1 wherein the rotor extends along a second axis oblique to the axis of the retaining member in response to the alternating current flowing through the coil.

24. The motor of claim 1 wherein the rotor has a center of mass and wherein the rotor gyrates about the center of mass in response to the alternating current flowing through the coil.

25. The motor of claim 1 wherein the rotor has a rotor axis and a center of mass along the rotor axis, wherein the magnet has a north pole and a south pole, and wherein at least one of the north poles and the south poles is axially spaced from the center of mass.

26. The motor of claim 1, wherein the retaining member is integrally formed as part of a unitary structure at least partially encapsulating and supporting the first prong and the second prong.

27. A motor for use with an alternating current electrical outlet, the motor comprising:
   a retaining member having at least one circumferential surface extending about an axis;
   a rotor adjacent to retaining member, the rotor having a magnet; and
   a nutational actuator for nutating the rotor about the axis, the nutational actuator including:
      at least one magnetic member proximate the rotor;
      an electrically conductive coil about said at least one magnetic member, the coil having first and second opposite ends; and a first prong electrically connected to the first end of the coil and a second prong electrically connected to the second end of the coil, whereby the alternating current flowing through the coil causes the rotor to nutate about the axis defined by the stator, wherein the retaining member is formed as an integral unitary structure Partially encapsulating and supporting the first prong and the second prong.

28. The motor of claim 27 wherein the magnetic member includes a first end portion proximate the rotor.

29. The motor of claim 27 wherein the magnetic member includes first and second end portions angularly spaced 180 degrees from one another on opposite sides of the axis.

30. The motor of claim 27 wherein the at least one circumferential surface of the retaining member comprises an inner circumferential surface.

31. The motor of claim 27 wherein the at least one circumferential surface of the retaining member comprises an outer circumferential surface.

32. The motor of claim 27 wherein the magnet comprises a permanent magnet.

33. The motor of claim 27 wherein the rotor extends along a rotor axis and wherein the magnet include first and second poles displaced from one another in a direction along the rotor axis.

34. The motor of claim 27 wherein the at least one circumferential surface is resiliently compressible.

35. A motor for use with a source of an alternating electrical current, the motor comprising:
   a retaining member having at least one circumferential surface extending about an axis;
   a rotor adjacent to the retaining member, the rotor having a center of mass and a magnet;
   a magnetic member proximate the rotor; and
   an electrically conductive coil about the magnetic member, the coil having first and second opposite ends adapted to be electrically connected to the source of alternating electrical current, wherein the rotor gyrates about the center of mass in response to alternating electrical current flowing through the coil.

36. The motor of claim 35 wherein the rotor extends along a rotor axis and wherein the rotor axis extends oblique to the axis of the stator in response to alternating electric current flowing through the coil.

37. The motor of claim 35 wherein the magnet has a north pole and a south pole and wherein at least one of the north pole and the south pole is axially spaced from the center of mass of the rotor.

38. The motor of claim 37 wherein the north pole and the south pole of the magnet are located on a first axial side of the center of mass.

39. The motor of claim 35 including:
   a first prong configured for insertion into an alternating current electrical outlet and electrically connected to the first end of the coil; and
   a second prong configured for insertion into the electrical outlet and electrically connected to the second end of the coil.

40. The motor of claim 35 including a body supporting the magnetic member, wherein the retaining member and the body are integrally formed as part of a single unitary structure.

41. A motor for use with a source of alternating electrical current, the motor comprising:
   a retaining member having at least one circumferential surface extending about an axis, the stator being formed from a non-magnetic material;
   a rotor adjacent to the retaining member, the rotor having a magnet;
   magnetic member proximate the rotor; and
   an electrically conductive coil about the magnetic member, wherein the magnetic member and the electrically conductive coil form a stator and wherein the retaining member is integrally formed as part of a unitary structure supporting the magnetic member, the coil having first and second opposite ends adapted to be electrically connected to the source of alternating electrical current.

42. A method for rotatably driving a rotor having an axial length, an axial mid-point and first and second portions on opposite axial sides of the axial mid-point, the method comprising:
   providing a retaining member having first and second circumferential surface portions located about a first axis, the first and second circumferential surface portions extending on opposite sides of the first axis;
   positioning the rotor between the first and second circumferential surface portions; and
   pivoting the rotor about a second axis perpendicular to the first axis of the retaining member and at the axial mid-point such that the rotor rotates against the first and second circumferential surface portions.

43. The method of claim 42 wherein the first and second circumferential surface portions comprise inner circumferential surface portions.

44. The method of claim 42 wherein the step of pivoting the rotor about an axis substantially perpendicular to the axis of the stator includes alternately applying a force in a first direction and a force in a second substantially opposite direction to the first portion.

45. The method of claim 42 wherein the step of pivoting the rotor about an axis substantially perpendicular to axis of the stator includes alternately forcing the first rotor portion towards the first and second circumferential surface portions of the stator.

46. The motor of claim 45 wherein the step of alternately forcing the first rotor portion includes intermittently attracting the first rotor portion towards the first circumferential surface portion of the stator.

47. The method of claim 45 wherein the step of alternately forcing the first rotor portion of the rotor includes intermittently repelling the second rotor portion away from the first circumferential surface portion of the stator.

48. The method of claim 45 wherein the step of alternately forcing the first rotor portion towards the first circumferential surface portion of the stator includes the steps of:
   providing one of the rotor and the stator with a magnet;
   providing the other of the rotor and the stator with a magnetic member; and
   alternately magnetizing the magnetic member.

49. The method of claim 48 wherein the step of alternately magnetizing the magnetic member includes the step of directing an alternating electrical current about the magnetic member such that magnetic fields from the magnetic member alternately vary.

50. A motor for use with an alternating current electrical outlet, the motor comprising:
   a retaining member having at least one circumferential surface extending about an axis;
   a rotor adjacent to the retaining member, the rotor comprising a hollow tubular shaft made of plastic carrying a magnet;

a magnetic member proximate the rotor;

an electrically conductive coil about the magnetic member, the coil having first and second opposite ends; and a first prong configured for insertion into the electrical outlet and electrically connected to the first end of the coil, and a second prong configured for insertion into the electrical outlet and electrically connected to the second end of the coil, whereby alternating current flowing through the coil causes the rotor to nutate about the axis defined by the retaining member.

51. A motor for use with an alternating current electrical outlet, the motor comprising:

a retaining member having at least one circumferential surface extending about an axis;

a rotor adjacent to the retaining member, the rotor comprising a shaft including a moldable magnetic material molded in plastic and magnetized;

a magnetic member proximate the rotor;

an electrically conductive coil about the magnetic member, the coil having first and second opposite ends; and a first prong configured for insertion into the electrical outlet and electrically connected to the first end of the coil, and a second prong configured for insertion into the electrical outlet and electrically connected to the second end of the coil, whereby alternating current flowing through the coil causes the rotor to nutate about the axis defined by the retaining member.

52. A motor for use with an alternating current electrical outlet, the motor comprising:

a retaining member having at least one circumferential surface extending about an axis;

a rotor adjacent to the retaining member, the rotor having a magnet;

a magnetic member proximate the rotor;

an electrically conductive coil about the magnetic member, the coil having first and second opposite ends; and a first prong configured for insertion into the electrical outlet and electrically connected to the first end of the coil, and a second prong configured for insertion into the electrical outlet and electrically connected to the second end of the coil, whereby alternating current flowing through the coil causes the rotor to nutate about the axis defined by the retaining member, wherein the magnet of the rotor has a first portion with a first polarity and a second portion with a second opposite polarity, wherein the motor includes a retaining member magnet supported by the retaining member adjacent the rotor, wherein the retaining member magnet includes a third portion facing the second portion of the magnet of the rotor, wherein the third portion has the second polarity so as to repel the rotor.

53. A motor for use with a source of an alternating electrical current, the motor comprising:

a stator having at least one circumferential surface extending about an axis;

a rotor adjacent to the stator, the rotor having a center of mass and a magnet;

a magnetic member proximate the rotor; and an electrically conductive coil about the magnetic member, the coil having first and second opposite ends adapted to be electrically connected to the source of alternating electrical current, wherein the north pole and the south pole of the magnet are located on a first axial side of the center of mass.

* * * * *